June 16, 1964   C. GRAFF   3,137,517
ACCOUNTING FORMS AND METHOD OF EMPLOYING THE SAME
Filed Jan. 30, 1961   3 Sheets-Sheet 1

*INVENTOR.*
CHESTER GRAFF
BY *Naylor & Neal*
ATTORNEYS

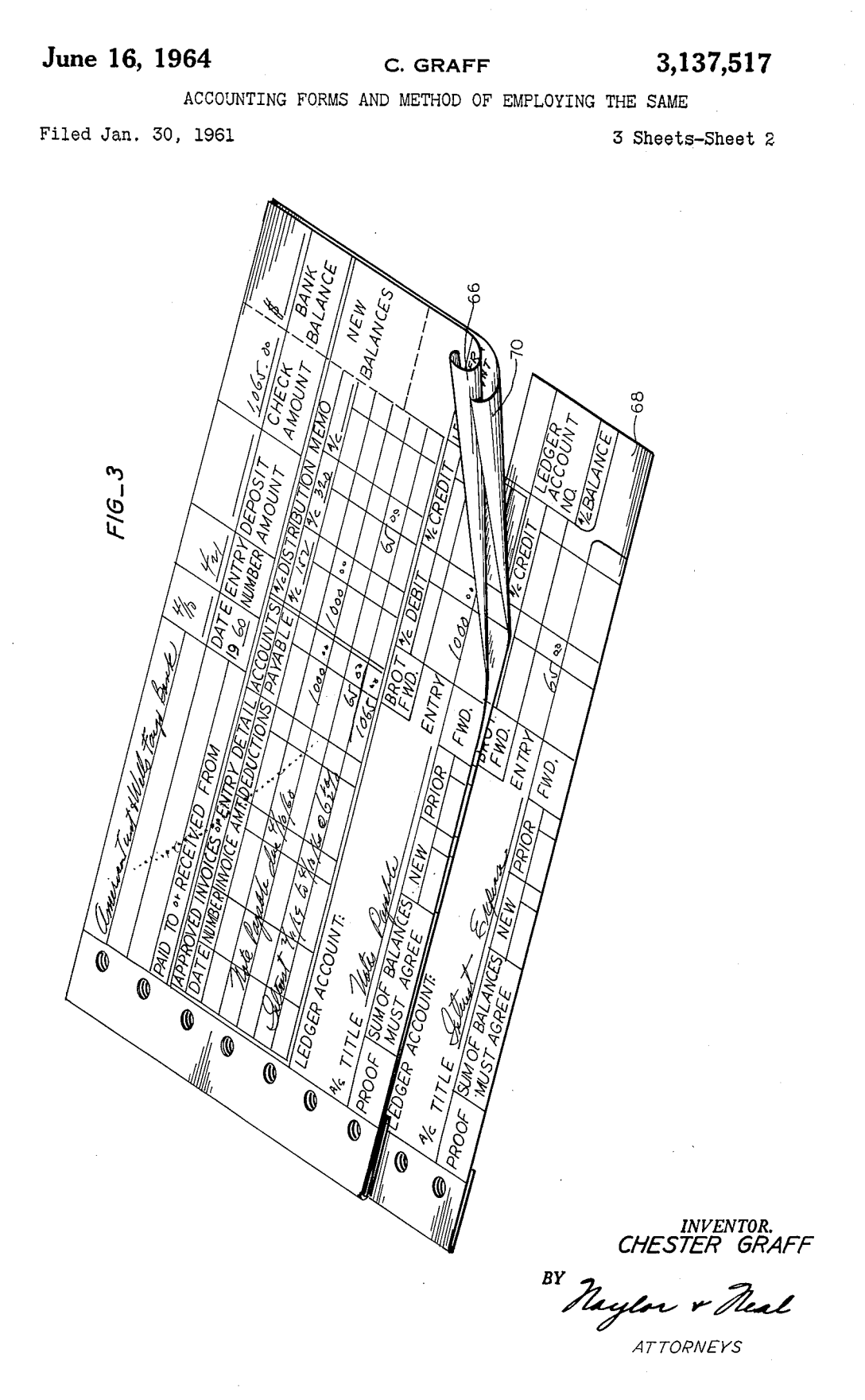

June 16, 1964 C. GRAFF 3,137,517
ACCOUNTING FORMS AND METHOD OF EMPLOYING THE SAME
Filed Jan. 30, 1961 3 Sheets-Sheet 2

FIG_3

INVENTOR.
CHESTER GRAFF
BY
ATTORNEYS

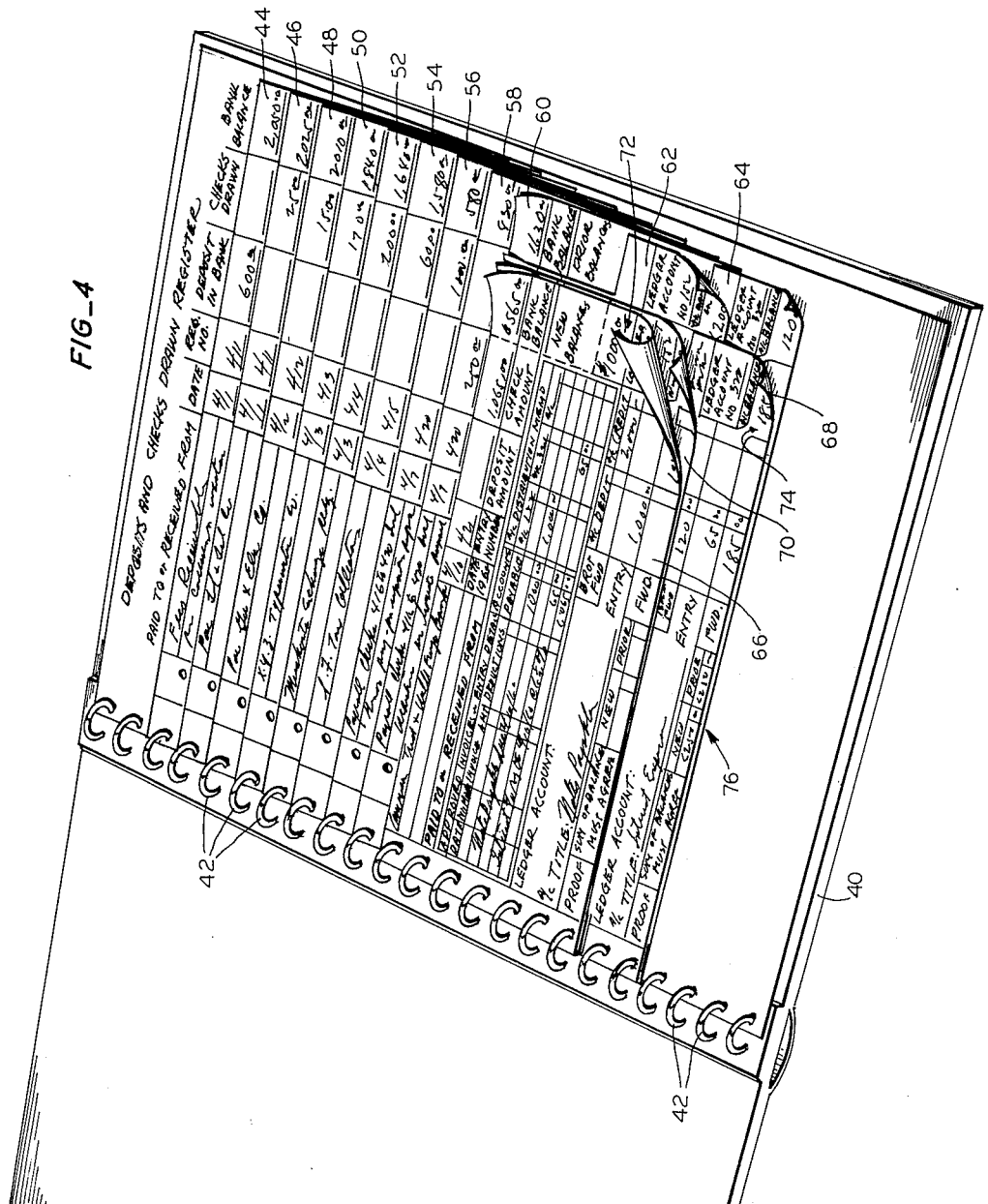

3,137,517
ACCOUNTING FORMS AND METHOD OF
EMPLOYING THE SAME
Chester Graff, 465 California St., San Francisco, Calif.
Filed Jan. 30, 1961, Ser. No. 85,623
6 Claims. (Cl. 282—29)

This invention relates to new accounting forms and to a method of accounting employing said forms.

It is a principal object of this invention to provide a new accounting form and a method of employing the same by which accounting transactions may be recorded and correlated as efficiently as possible.

It is another object of this invention to provide such forms which may be employed as original entry forms for accounting transactions and which may be employed also as a work sheet for correlating the transaction with prior accounting transactions and subsequent accounting transactions.

It is another object of the invention to provide such accounting forms which in addition to their utility as original entry forms and as components of an accounting work sheet may be employed as current records of account balances existing in suitable ledger accounts.

It is another object of the invention to provide such a new accounting form on which indicia may be recorded identifying a particular accounting transaction and in which the form is provided with means for assembling it with similar records of prior and/or subsequent transactions so that the assembly of forms provides a work sheet on which a bookkeeper can correlate transactions efficiently.

It is another object of this invention to provide such new accounting forms which when so assembled provide a simple and obvious means for a bookkeeper to prove the arithmetic accuracy of the acounting correlations made on the assembly of forms.

It is another object of the invention to provide such a new accounting form and a method of employing the same whereby double entry accounting may be performed by personnel of minimum skill and with a minimum amount of labor required.

It is another object of the invention to provide such news forms and method of employing the same whereby double entry accounting may be performed and current cash records and ledger account records kept while requiring a minimum number of accounting entries to be made.

It is another object of the invention to provide such new accounting forms and a method of employing the same which is efficiently adapted to the correlation of accounting transactions in which a plurality of ledger accounts may be effected by a single cash transaction.

It is a specific object of this invention to provide an accounting form with a records column thereon and means for mounting the form together with similar forms with the records columns of the forms positioned in two adjacent areas, whereby a current transaction entered on at least one of the forms can be correlated with prior transactions entered on other of the forms with old accounting balances indicated in one of said areas and the new accounting balances derived from the correlation indicated in the other of the areas.

It is another specific object of the invention to provide such accounting forms in which the means for mounting a plurality of the forms together permits any particular one of the forms to be mounted with its records column in either of the two adjacent areas, thereby permitting each form to be mounted in one position for correlation with prior transactions and in another position for correlation with future transactions.

It is a more specific object of the invention to provide such new accounting forms which are so constructed that a plurality of such forms may be assembled together in superposed relation with the records rows and columns thereon juxtapositioned for efficient correlation of the indicia on said forms.

It is another object of the invention to provide such new accounting forms which are constructed in this manner and in which each form may be employed in any desired position in the assembly of superposed forms thereby permitting the use of such forms in an accounting method in which each accounting form on which a particular transaction is recorded may be used in the first instance at one position in the superposed assembly for correlating the transaction thereon with prior transactions and may then be used in a second instance at a second position in said superposed assembly for correlating that transaction with future transactions.

It is another object of the invention to provide such an accounting form constructed in this manner and a method of employing the same in which the same system of superposition of forms is used for correlation of each accounting transaction with prior transactions thereby providing a simple repetitive routine for correlating accounting transactions.

Other objects and advantages of the present invention will become more apparent from the following description read in conjunction with the attached drawing in which:

FIG. 1 is a plan view of an accounting form constructed in accordance with this invention;

FIG. 2 is a plan view of a similar form constructed in accordance with this invention and adapted to be employed together with a form similar to the form in FIG. 1 but with the word "prior" printed over the word "balances" in the righthand column of the form of FIG. 1;

FIG. 3 is a perspective view of a group of forms constructed in accordance with this invention with the forms adapted to be employed as a complete double entry accounting record of a transaction in which two ledger accounts are effected by a single cash transaction; and FIG. 4 is a perspective view of an account book containing a "deposits and checks drawn register" and with a plurality of forms constructed in accordance with this invention assembled therein for the performance of the accounting method of this invention.

Referring now in detail to the drawings and particularly to FIG. 1, the accounting form illustrated therein comprises a sheet of paper or the like having a lefthand edge 10 and a set of apertures 12 therein extending along a line generally parallel to the edge 10. A second set of apertures 14 is provided in the sheet extending along a line generally parallel to and adjacent to the set of apertures 12. The sets of apertures 12 and 14 are identical with one aperture in the set 14 lying along a horizontal line across the form through the center of each of the apertures in the set 12.

The righthand edge 16 of the form is provided with a vertical column 18 thereon extending generally parallel to the sets of apertures 12 and 14. The horizontal width of the column 18 (as measured from the edge 16 to the lefthand boundary line 20 of the column) is substantially equal to the horizontal distance between the centers of corresponding apertures in the sets of apertures 12 and 14. In other words, if a second form identical to the form of FIG. 1 is placed on top of the form of FIG. 1 with the set of apertures 14 of the upper form positioned on top of the set of apertures 12 of the lower form, the records columns 18 of the two forms will be positioned in side-by-side relation.

The form of FIG. 1 is provided with opposed top and bottom edges 22 and 24 respectively. A row 26 is provided along the top edge 22 for the entry of indicia identifying a particular accounting transaction. The width of the row 26 (measured vertically) is equal to an integral multiple of the distance between the centers of adjacent apertures in one of the sets of apertures 12 and 14; in the particular form illustrated the integral multiple is the first integral multiple in which the width of the row 26 is equal to the distance between the centers of adjacent apertures. Thus, when a form identical to the form of FIG. 1 is placed on top of the form of FIG. 1 with the corresponding sets of apertures 12 and 14 of the two forms aligned with each other and with the top apertures of the sets 12 and 14 of the top form aligned with the second from the top apertures of the sets 12 and 14 of the bottom form, the two forms will be assembled with the rows 26 thereof juxtapositioned vertically of the assembly.

A record row 28 is provided on the form of FIG. 1 extending along the bottom edge 24 thereof and having a width (measured vertically) substantially equal to an integral multiple of the distance between the centers of adjacent apertures in one of the sets of apertures 12 and 14; in the particular form illustrated the integral multiple is the second multiple whereby the width of the row 28 is twice the distance between adjacent apertures in the set 14. Thus, in similar manner, when a form identical to the form of FIG. 1 is positioned on top of the form of FIG. 1 with the bottom apertures of the sets 12 and 14 of the top form positioned on top of the third from the bottom apertures of the sets 12 and 14 respectively of the bottom form, the rows 28 of the two forms will be juxtapositioned together vertically of the assembly.

The central area of the form of FIG. 1, denoted by the arrows 30 is provided with suitable columns and rows for the recording of accounting indicia on which a single cash transaction may be broken down into a plurality of ledger account transactions. It should be noted that the records column 18 and the records row 28 overlap in a corner area (indicated by the arrows 32) the purpose of which will appear in greater detail hereinafter.

It will be noted that suitable printed indicia are provided in the various areas of the face of the form of FIG. 1 to indicate the positions where various accounting entries should be made on the form. It should also be noted that a vertical crease 34 is provided in the form of FIG. 1 to facilitate the folding of the form along a line parallel to and equally spaced between the sets of apertures 12 and 14; when the form is folded along the line 34, the sets of apertures 12 and 14 are moved into coincidence with each other.

The form of FIG. 2 is substantially identical to the form of FIG. 1 except that in the form of FIG. 2 a portion of the records column 18 (indicated at 36) is surrounded by a series of perforations 38 by which the portion 36 may be easily detached from the remainder of the form. As will appear hereinafter, the use of the form of FIG. 2 is preferably accompanied by the use of a form similar to the form of FIG. 1 with the word "prior" printed in the records column 18 thereof immediately above the word "balances." In some instances it may also be desirable to employ with the form of FIG. 2 and the modified form of FIG. 1 a third form substantially identical to the form of FIG. 2 with the detachable portion 36 thereof removed.

By way of example of the operation of the method of this invention, the original recording of a particular accounting transaction is illustrated on the assembly of three forms shown in FIG. 3 in which the top form is a form constructed in accordance with FIG. 2, the intermediate form is a form constructed in accordance with FIG. 1 modified by the above-mentioned insertion of the word "prior," and the bottom form is a form constructed in accordance with FIG. 2 but with the detachable portion 36 thereof removed. For the sake of illustration in FIG. 3, the three forms shown therein are illustrated folded along the line 34 thereof with the apertures 12 and 14 therein in vertical alignment. The forms normally would be prepared in unfolded condition, but are illustrated in FIG. 3 in the folded condition in which they are inserted in the assembly of FIG. 4.

When the original entries are made in the top row 26 of these forms and in the center area 30 thereof, the three forms are preferably assembled in vertically aligned relation with sheets of carbon paper therebetween so that the indicia in the row 26 and center area 30 are simultaneously entered on all three forms. The three forms are then moved to the position shown in FIG. 3 in which the bottom form has been moved so that its third from the bottom aperture 14 is in alignment with the bottom aperture 14 on the other two forms. After the three forms shown in FIG. 3 have been thus assembled, they are assembled with similar forms of prior accounting transactions as shown in FIG. 4 and as described in greater detail hereinafter.

When the forms shown in FIG. 3 are assembled together with similar forms of prior accounting transactions to provide a work sheet for correlating the transactions, a row of metal pins is provided for insertion in the sets of apertures 12 and 14, and this row of pins is preferably the set of rings in a looseleaf binder. Thus, as illustrated in FIG. 4, a looseleaf binder 40, provided with a set of separable rings 42, is employed in an accounting system as a permanent record of prior transactions of a particular type. The record illustrated in FIG. 4 is a "deposits and checks drawn register" in which one of the sheets of FIG. 1 is kept for each prior cash transaction with the sheets spaced vertically with respect to each other by a distance equal to the distance separating adjacent rings 42. In this manner, the top row 26 of each form is visible for convenient reference to the indicia thereon which identifies the accounting transactions recorded on the form. In this manner the history of cash transactions prior to the transaction recorded in FIG. 3 is indicated in FIG. 4 by the sheets 44—60, the sheet 60 recording a bank deposit of $800.00.

When it is desired to correlate the accounting transaction recorded in FIG. 3 with prior transactions, the records of prior transactions are consulted to select therefrom the most recent forms in the ledger accounts which are effected by the new transaction. These selected forms are placed upon the rings 42 in extended position, that is, with their sets of apertures 12 received upon the rings and positioned with respect to the sheet 60 as indicated in FIG. 4 so that the corner areas 32 of the selected forms are positioned below and in alignment with the column 18 of the form 60.

In the accounting transaction which is illustrated as an example herein, the selected forms are the sheets 62 and 64 on which are entered the account balances of "notes payable" and "interest expense" ledger accounts respectively. It should be noted that the form 64 is positioned on the rings 42 underneath the form 62 and with the bottom edge of the form 64 spaced below the bottom edge of the form 62 by a distance equal to twice the distance between adjacent rings 42 so that the records rows 28 of the two forms 62 and 64 are both visible for correlation.

With the forms 60, 62 and 64 so positioned together on the rings 42, the new forms shown in FIG. 3 are then placed on top of the old forms with the rings 42 extending through the apertures 14 in the new forms so that the records columns 18 of the new forms are positioned beside the records columns 18 of the old forms as shown in FIG. 4. As illustrated in FIG. 4, the new forms are folded along the line 34 thereof prior to mounting on the rings 42 thereby facilitating the mounting of the new forms in "retracted" position. The new forms need not be folded, however, if a simple line of vertical pins is employed in lieu of the rings 42.

As illustrated in FIGS. 3 and 4, the new forms employed for recording and correlating the accounting transaction exemplied are: a form 66 identical to the form illustrated in FIG. 2 and with indicia entered thereon indicating the particular transaction involved and the ledger accounts effected by the transaction; a similar form 68 having similar indicia thereon and having the removable portion 36 thereof detached; and a form 70 which is substantially identical to the form shown in FIG. 1 with the addition of the word "prior" printed in the records column 18 above the word "balances." Preferably, the underside of the detachable portion 36 of the form 66 is coated with a carbon transfer substance by which indicia entered on the detachable portion 36 of the form 66 is transferred to the form 70.

The form 70 is employed for correlation of the new transaction with the prior bank balance in the "deposits and checks drawn register"; the form 66 is employed for correlating the new transaction with the prior account balance in the "notes payable" ledger account, and the form 68 is employed for correlating the new transaction with the prior account balance in the "interest expense" ledger account. As illustrated in FIG. 4, the two forms 60 and 70 which correlate the bank balance are positioned in horizontal alignment with each other; the two forms 62 and 66 which relate to the "notes payable" ledger account are positioned in horizontal alignment with each other, and the two forms 64 and 68 which relate to the "interest expense" ledger account are positioned in horizontal alignment with each other.

With the new and old accounting forms assembled together as illustrated in FIG. 4, indicia are entered in the top righthand corner of form 70 (by means of carbon transfer through the detachable portion 36 of the form 66) to indicate in the top righthand corner of the form 70 the new bank balance existing after the new accounting transaction. Indicia are then entered in the records rows 28 of the forms 66 and 68 designating the two ledger accounts which are effected by the transaction and the monetary amounts by which they are effected. These indicia in the rows 28 of the forms 66 and 68 are then correlated with the adjacent records of the prior account balances in the related ledger accounts as they appear on the forms 62 and 64 respectively, and the new balances then existing in the ledger account are then entered in the corner areas 32 of the forms 66 and 68 as indicated at 72 and 74 respectively.

It will then be noted that the prior cash and ledger account balances are entered in the righthand columns 18 in alignment with the words "prior balances"; the new cash and ledger account balances, existing after the new transaction, are entered in the lefthand records columns 18 in alignment with the words "new balances." While the forms are still assembled as illustrated in FIG. 4, the bookkeeper enters at 76 on form 68 the sums of these new and prior balances taking into account whether each account balance is a credit balance or a debit balance; when the two sums entered at 76 are observed to be identical, the bookkeeper has checked the arithmetic accuracy of the correlation of the new transaction to the prior account balances.

After the arithmetic accuracy of this correlation has been proven, the forms 62 through 70 are removed from the rings 42, and the forms 62 and 64 are filed in some suitable storage place. The forms 66–70 are unfolded along the line 34 thereby placing them in extended condition where they may be inserted on the rings 42 in place of the forms 60–64 for correlation with some future accounting transaction. With the forms 66–70 in unfolded condition, the detachable portion 36 of the form 66 is removed and the forms 66 and 68 are placed in a suitable file of current ledger account balances so that either or both of the forms 66 and 68 may be selected for use in future correlation in a manner similar to the manner in which the forms 62 and 64 respectively were used as described above. The form 70 is placed back on the rings 42 in extended position in the same positional relation to the form 60 which the form 60 bears to the form 58; in this manner the form 70 then becomes the last entry in the deposits and checks drawn registers and the forms 66 and 68 become the current records of account balances in the "notes payable" and "interest expense" ledger accounts respectively. Of course, a register of forms similar to the deposits and checks drawn register may be maintained for each ledger account in which case, the forms 62 and 64 would be returned to the appropriate register as the second to the last entries therein, and the forms 66 and 68 would be inserted in these ledger account registers as the last entries therein.

From the above description it will be noted that the new accounting forms provided in accordance with this invention and the method of employing them provide a unique arrangement for accomplishing the above-enumerated objects of the invention. By the use of these forms and the method described, an accounting system is provided in which an accounting transaction is originally entered and in which the original accounting entry serves as a work sheet for correlating the accounting transaction with prior account balances and as records of the new correlated account balances. In this manner this system provides a system of double entry bookkeeping with a minimum amount of manual entries for a bookkeeper to make and hence with a minimum number of acts in which the bookkeeper can make an arithmetic error. In addition, the particular arrangement of new and old forms on the assembled work sheet which is made in this system provides an efficient arithmetic proof of the accuracy of the bookkeeper's work.

If it is desired to modify the system to eliminate the necessity of the bookkeeper performing the manual operation of removing the removable portion 36 of the form 66 and the like, all of the forms used in the system may be made identical, i.e., identical to the form of FIG. 1, and when the assembled work sheet illustrated in FIG. 4 is made by properly assembling the new and old forms, the forms 62, 64, 66 and 68 may be placed on the rings 42 one ring lower with respect to the forms 60 and 70 than their positions illustrated in FIG. 4. When this modified system is employed, the records row 26 of the form 70 will be visible above the top edge of the form 66 and aligned with the form 60, and the records rows 28 of the old ledger account forms 62 and 64 will still be maintained in horizontal alignment with the records rows 28 of the new ledger account forms 66 and 68.

While certain embodiments of the new accounting forms and accounting method of my invention have been illustrated and described in detail herein, it is obvious that many modifications thereof may be made without departing from the spirit and scope of the invention.

I claim:

1. The method of making and keeping accounting records which comprises:
    (a) providing a plurality of blank accounting forms, each form comprising an accounting sheet having a records column thereon extending along a vertical edge thereof for the entry of accounting indicia, and mounting means forming a part of said sheet for removably supporting two of said sheets together in superposed relation with the records columns of said two sheets uncovered and positioned in side-by-side relation;
    (b) providing a record including a completed one of said forms with old accounting indicia entered in the records column thereof;
    (c) entering indicia on a new one of said blank forms recording a new accounting transaction; and
    (d) manipulating said mounting means on said completed and new forms to support said forms together in said superposed relation with the records columns thereof in said side-by-side relation and with said new form on top of said completed form so that said transaction may be correlated with said old accounting indicia and new accounting indicia can be entered in said column of said selected form;

(e) while said completed and new forms are in said superposed relation, entering indicia in said records column of said new form;

(f) removing said new form from said completed form; and (g) supplanting said completed form in said record by said new form.

2. The method of claim 1 characterized further by the addition after the final step of claim 1 of the step comprising:

employing said new form in place of said completed form in a group of steps similar to steps (c) through (g) but employing a second new one of said blank forms for correlating a second accounting transaction.

3. The method of making accounting records which include a plurality of ledger accounts for maintaining account balances of related accounting transactions which comprises:

(a) providing a plurality of blank accounting forms, each form comprising an accounting sheet having a records column thereon extending along a vertical edge thereof for the entry of accounting indicia, and mounting means forming a part of said sheet for removably supporting two of said sheets together in superposed relation with said records columns of said two sheets uncovered and positioned in side-by-side relation;

(b) providing a completed one of said forms for each of said ledger accounts with old accounting indicia of said ledger account entered in said records column of said completed form;

(c) entering indicia on one of said blank accounting forms recording a particular accounting transaction;

(d) selecting one of said completed forms to be correlated with said one blank form;

(e) correlating said one blank accounting form and said selected accounting form while supporting said forms in said superposed relation with said one blank form on top of said selected form and with said records columns of said two forms positioned in said side-by-side relation so that accounting indicia may be entered in said records column of said one blank form in juxtaposition with said records column of said selected form; and (f) while said one blank form and said selected form are supported in said superposed relation, entering indicia in said records column of said one blank form.

4. The method claim 3 characterized further by the addition after the final step of claim 3 of the steps comprising:

(g) removing said one blank form from said selected form; and (h) employing said one blank form in place of said selected form in a group of steps similar to steps (c) through (h) but employing a second one of said blank forms for correlating a second accounting transaction with old accounting indiica.

5. The method of preserving and using accounting records with a plurality of accounting forms where each form comprises an accounting sheet having a records column thereon extending along a vertical edge thereof for the entry of accounting indicia, and two columns of apertures in said sheet remote from and parallel to said column and spaced apart by a distance equal to the width of said column which comprises:

(a) maintaining a plurality of groups of said forms with accounting indicia thereon representing past accounting transactions of a similar plurality of different kinds and with each group including one form representing the last transaction in that kind, (b) providing a column of pins positioned to receive either of said columns of apertures in one of said forms with one of said groups of forms mounted on said pins in shingled relation (c) placing on said pins a first new one of said forms for the entry of a new transaction in said one group, (d) placing in superposed relation on said column of pins a second new one of said forms and said one form of one of the remainder of said groups with the bottom one of said two forms having received on said pins its column of apertures remote from its record column and the uppermost of said two forms having received on said pins its column of apertures adjacent to its records column whereby a new accounting transaction may be recorded on said new ones of said forms while employing the records columns of said new and completed forms and (e) thereafter returning said second new form and said one form to the group from which said one form was taken while designating said new form as the latest in said group.

6. The method of preserving and using accounting records with a plurality of accounting forms where each form comprises an accounting sheet having a records column thereon extending along a vertical edge thereof for the entry of accounting indicia and two columns of apertures in said sheet remote from and parallel to said records column and spaced apart by a distance equal to the width of said records column which comprises:

(a) maintaining in superposed relation on a column of pins a plurality of said accounting forms with indicia thereon representing past accounting transactions and with each of said forms having received on said pins its column of apertures remote from its records column, (b) placing a pair of new ones of said forms on said pins superposed on each other and on top of said plurality of forms with said new ones of said forms having received on said pins their columns of apertures adjacent to their records columns whereby a new accounting transaction may be recorded on said new forms while using the records columns on said new forms (c) removing a portion of the records column of the upper one of said new forms to uncover a portion of the records column of the other new form under it and on one of said plurality of forms, and (d) thereafter removing said new forms from said pins and replacing one of said new forms on said pins with its column of apertures remote from its records column received on said pins.

References Cited in the file of this patent

UNITED STATES PATENTS

| 2,597,579 | Gleanes | May 20, 1952 |
| 2,647,765 | Brechner | Aug. 4, 1953 |
| 2,687,902 | Becker | Aug. 31, 1954 |

FOREIGN PATENTS

| 394,208 | Great Britain | June 22, 1933 |
| 566,561 | Great Britain | Jan. 23, 1945 |
| 558,159 | Italy | Feb. 25, 1957 |